June 3, 1930.  J. W. WILDERMUTH  1,761,763
SHEET GLASS APPARATUS
Filed Oct. 4, 1926
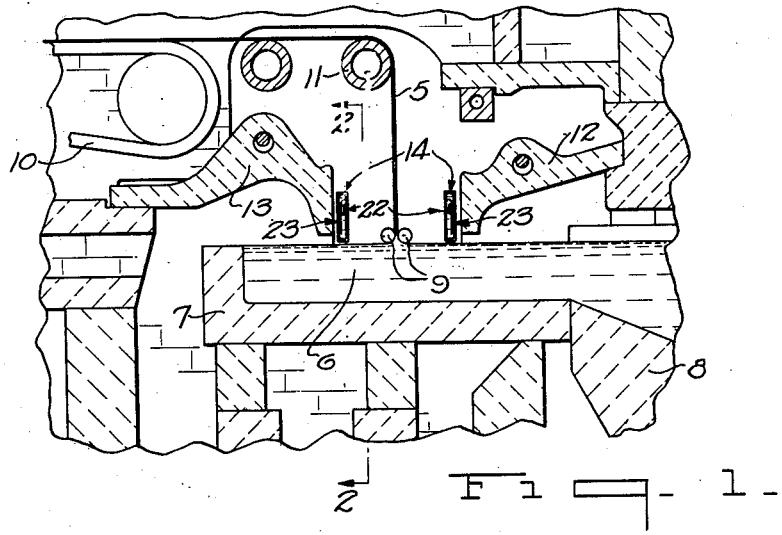
Fig. 1.
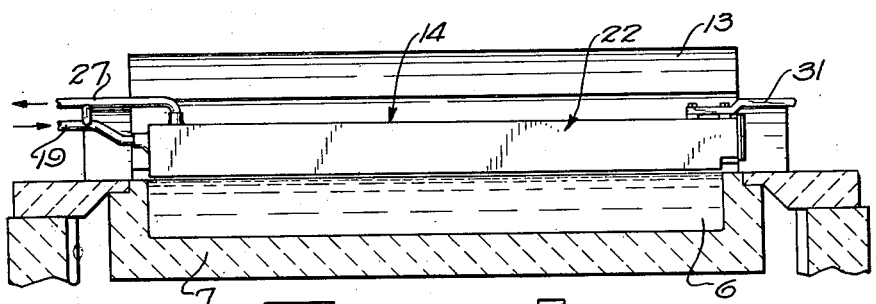
Fig. 2.
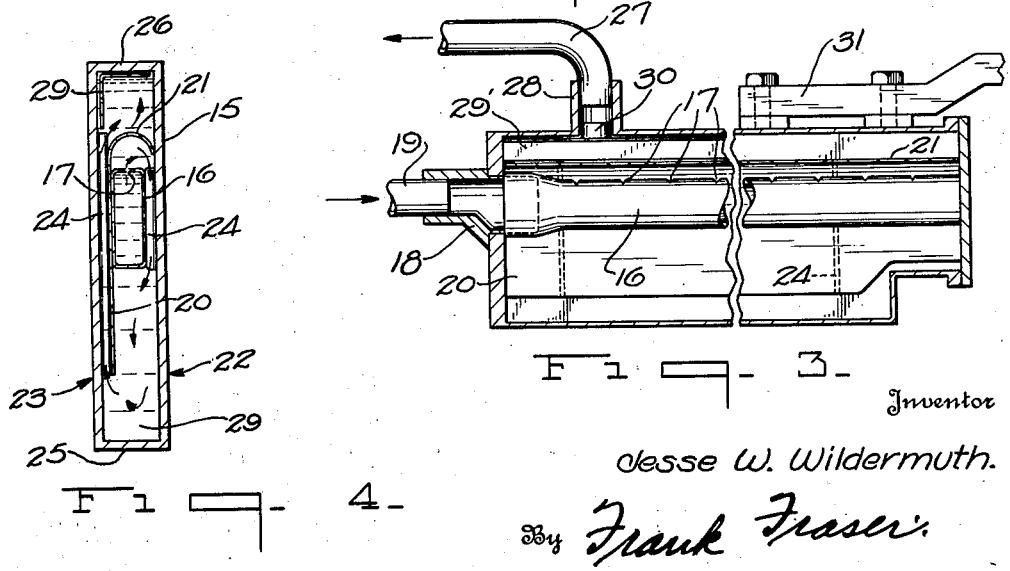
Fig. 3.
Fig. 4.
Inventor
Jesse W. Wildermuth.
By Frank Fraser
Attorney Patented June 3, 1930

1,761,763

UNITED STATES PATENT OFFICE

JESSE W. WILDERMUTH, OF LANCASTER, OHIO, ASSIGNOR TO LIBBEY-OWENS GLASS COMPANY, OF TOLEDO, OHIO, A CORPORATION OF OHIO

SHEET-GLASS APPARATUS

Application filed October 4, 1926. Serial No. 139,318.

The present invention relates to sheet glass apparatus.

An object of the invention is to provide in sheet glass apparatus an improved form of heat absorbing means.

Another object of the invention is to provide a heat absorbing means comprising a casing, and means for introducing a cooling medium therein, the said casing having means arranged therein for directing the cooling medium downwardly of one wall of said casing and upwardly of another wall thereof.

Still another object of the invention is to provide in sheet glass apparatus a heat absorbing shield comprising a casing, means for introducing a cooling medium therein, and a deflector plate for directing the cooling medium down the front wall of the casing and upwardly of the rear wall thereof.

Still another object of the invention is to provide a heat absorbing means of this nature comprising a casing formed from preferably a non-scaling metal such as brass, the casing including means for introducing a cooling medium therein and a deflector partition having a curved end adapted to direct the cooling medium entering the casing downwardly of the front wall thereof and upwardly of the rear wall, and an outlet for permitting the exit of the cooling medium after it has served its useful purpose, the casing including means arranged therein for preventing sweating thereof around the outlet opening.

Other objects and advantages of the invention will become more apparent during the course of the following description.

In the drawings wherein like numerals are employed to designate like parts throughout the same, Fig. 1 is a fragmentary vertical longitudinal section through a form of sheet glass apparatus illustrating my invention in use;

Fig. 2 is a section taken on line 2—2 in Fig. 1;

Fig. 3 is a sectional view showing the internal parts of the cooler, and

Fig. 4 is a transverse vertical section showing the path of travel of a cooling medium through the cooler.

In Fig. 1 is represented diagrammatically the type of machine disclosed in the Colburn Patent No. 1,248,809, granted Dec. 4, 1917, wherein a sheet 5 is continuously drawn from a mass of molten glass 6 contained in a suitable draw pot 7 which is continuously supplied with molten glass from a tank furnace 8. The sheet 5 is initially drawn in the vertical plane, and edge engaging means 9 are provided to prevent narrowing of the sheet at its base. The sheet is drawn by the drawing and flattening means 10, being deflected over a suitable bending roll 11.

Lip-tiles 12 and 13 respectively are arranged over the mass of molten glass 6 and in spaced relation thereto and to each other to protect the sheet during its formative period, and during its vertical run heat absorbing shields, designated in their entirety by the numerals 14, are used.

Heretofore, it has been customary to construct these heat absorbing shields from iron. It is necessary when iron coolers are in use to remove them and clean the same frequently as lime and scale form rapidly within such coolers. Further, the iron coolers are not adapted for cleaning out as lime will not loosen freely or entirely from the iron. Cold water is the customary cooling medium used.

Another difficulty experienced in the use of the type of cooler disclosed in the Colburn patent above referred to is what is known in the art as "sweating." I have noticed that the trouble from sweating takes place on the cooler on the side of the wall next to the lip-tile. The present form of cooler has been designed to prevent sweating at any point so that a cooling medium may be circulated through the coolers without causing the formation of sweating. Furthermore, the coolers are formed in such a manner and from such materials that the formation of sludge or other foreign deposit will be slow and easily removable if it does form.

Referring particularly to Figs. 3 and 4 of the drawings, the numeral 15 designates a casing preferably rectangular in its formation, and having an internal bore. Arranged within the casing 15 is an inlet pipe or conduit 16 which is provided with the perforations 17 arranged preferably along the top thereof. The inlet member 16 is connected to the nipple 18 having connection with a source of cooling medium 19.

Associated with the inlet member 16 is a deflector plate or partition wall 20 which is preferably connected directly to said conduit as illustrated in Fig. 4. The upper end of the partition wall 20 is arcuated to form the end 21. The partition wall 20 is arranged in spaced relation to both the front wall 22 and the rear wall 23 of the casing 15, and is arranged preferably closer to the rear wall 23. Wires or similar spacing members 24 are used to prevent accidental displacement of the parts when in use. The bottom of the partition wall 20 is arranged in spaced relation to the bottom 25 of the casing, while the arcuated end 21 is arranged in spaced relation to the top 26 thereof.

An outlet pipe 27, shown in Fig. 3, is received within the collar 28 carried by the casing, and permits the removal of the cooling medium 29. To prevent sweating of the cooler around the exit, a plate 29' is used so that the cooling medium does not come in contact with the casing proper at this point. An extension 30, having an opening therethrough, may be formed on the plate and received in the collar 28. Suitable bracket means 31 may be used to mount the cooler means in an operative position.

In operation, the cooling medium is introduced within the casing through the pipe 19 and perforated conduit 16, the cooling medium, which is preferably water, following the path indicated by the arrows in Fig. 4. It will be seen that the water will be directed by the arcuated end 21 of the partition wall 20 downwardly of the wall 22 passing under the partition wall 20 and upwardly of the wall 23, passing out from the cooler through the conduit 27.

In actual operation, the coolers are preferably so mounted that the walls 22 of the casings will be the front walls so that the cooling medium will pass down the wall nearest the sheet 5, passing upwardly along the wall nearest the lip-tiles 12 and 13 respectively.

The coolers are preferably formed from brass as this is a non-scaling metal, and is particularly well adapted for cooler material as the casing formed from this metal can be easily cleaned when necessary. It has been found in actual practice that the action of heat absorbing shields formed in accordance with the present invention gives far better results than the old type of iron coolers. The old type of iron coolers, as has been pointed out, permitted collection of sludge therein, all of which could not be removed when cleaned, so that the walls of the iron coolers were not uniform in thickness, making it impossible to get a uniform heat absorption from the glass thereunder. Also, with this improved type of cooler no sweating takes place.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass apparatus, a heat absorbing member comprising a casing, means for introducing a cooling medium therein, an outlet, and means arranged within the casing for directing the incoming cooling medium along one wall thereof, and the outgoing medium along another wall thereof.

2. In glass apparatus, a heat absorbing member comprising a casing, means for introducing a cooling medium therein, an outlet therefor, and means arranged within the casing for directing the incoming cooling medium along one wall thereof, and the outgoing medium along the opposite wall thereof.

3. In sheet glass apparatus, a heat absorbing member adapted to be positioned at one side of the sheet comprising a casing, means arranged within the casing for receiving a cooling medium and from which said cooling medium is adapted to pass into said casing, and means also within the casing for directing the cooling medium, as it issues from the first named means, initially along the wall of the casing adjacent the glass sheet.

4. In sheet glass apparatus, a heat absorbing member adapted to be positioned at one side of the sheet comprising an elongated casing, means extending longitudinally within the casing for receiving a cooling medium and having a series of openings through which said cooling medium is adapted to pass into said casing, and a deflector also within the casing for directing the cooling medium, as it issues from said first named means, initially along the wall of the casing adjacent the glass sheet.

5. In sheet glass apparatus, a heat absorbing member adapted to be positioned at one side of the sheet comprising a casing, a conduit extending within the casing for receiving a cooling medium and having a series of openings in the top thereof through which said cooling medium is adapted to pass into the casing, and a curved deflector plate arranged above said openings for directing the cooling medium, as it issues from the conduit, downwardly along the wall of the casing adjacent the glass sheet.

6. In glass apparatus, a heat absorbing member comprising a casing, means for introducing a cooling medium therein, and a deflector member for directing the medium downwardly of the front wall and upwardly of the rear wall.

7. In glass apparatus, a heat absorbing member comprising a casing, means for introducing a cooling medium therein, and means for directing the cooling medium downwardly of the front wall of the casing, and upwardly of the rear wall thereof.

8. In glass apparatus, a heat absorbing member comprising a casing, means for introducing a cooling medium therein, and means for directing the same downwardly of one wall of said casing and upwardly of another wall thereof.

9. In glass apparatus, a heat absorbing member comprising a casing, means for introducing a cooling medium therein, and a vertical partition therein for directing the cooling medium down one wall of the casing and up the opposite wall thereof.

10. In glass apparatus, a heat absorbing member comprising a casing, means for introducing a cooling medium therein, and a deflector arranged over said means for directing the cooling medium down one of the side walls only.

11. In glass apparatus, a heat absorbing member comprising a casing, means for introducing a cooling medium therein, an outlet therefor, and a plate arranged within the casing and contacting with the wall thereof around the outlet to prevent sweating of the casing around said outlet.

12. In glass apparatus, a heat absorbing member comprising a casing, means for introducing a cooling medium therein, a vertical partition wall associated with said means and spaced from the side walls of the casing, the lower edge of the partition wall being arranged in spaced relation to the bottom of the cooler whereby the cooling medium can pass down one side wall of the partition, under the same, and up the other side wall thereof.

13. In sheet glass apparatus, a draw pot containing a mass of molten glass, means for drawing a sheet therefrom, a lip-tile arranged over the molten glass, and a heat absorbing member associated with the lip-tile and comprising a casing, means for introducing a cooling medium therein, and means causing all of the cooling medium to pass up the wall of the casing nearest the lip-tile.

14. In sheet glass apparatus, a draw pot containing a mass of molten glass, means for drawing a sheet therefrom, a lip-tile arranged over the molten glass and to one side of the sheet, and a heat absorbing member associated with the lip-tile comprising a casing, means for introducing a cooling medium therein, and means for causing the incoming medium to pass down the wall of the casing nearest to said sheet of glass.

15. In sheet glass apparatus, a draw pot containing a mass of molten glass, means for drawing a sheet therefrom, a lip-tile arranged over the molten glass and to one side of the sheet, and a heat absorbing member associated with the lip-tile comprising a casing, means for introducing a cooling medium therein, and means for causing the incoming medium to pass down the wall of the casing nearest to said sheet of glass and to pass upwardly of the wall nearest said lip-tile.

16. In sheet glass apparatus, a draw pot containing a mass of molten glass, means for drawing a sheet therefrom, a lip-tile arranged over the molten glass and to one side of the sheet, and a heat absorbing member associated with the lip-tile comprising a casing, means for introducing a cooling medium therein, means for causing the incoming medium to pass down the wall of the casing nearest to said sheet of glass and to pass upwardly of the wall nearest said lip-tile, and an outlet pipe for said medium.

17. In sheet glass apparatus, a draw pot containing a mass of molten glass, means for drawing a sheet therefrom, a lip-tile arranged over the molten glass and to one side of the sheet, and a heat absorbing member associated with the lip-tile comprising a casing, means for introducing a cooling medium therein, means for causing the incoming medium to pass down the wall of the casing nearest to said sheet of glass and to pass upwardly of the wall nearest said lip-tile, an outlet pipe for said medium, and means on the inside of the casing to prevent sweating of the cooler around the outlet.

18. In sheet glass apparatus, a heat absorbing member comprising a casing, an inlet and an outlet therefor, and a member so arranged within the casing as to cause two vertically moving bodies of cooling medium therein, said bodies traveling in opposite directions along opposite side walls of said casing.

Signed at Lancaster, in the county of Fairfield and State of Ohio, this thirtieth day of September, 1926.

JESSE W. WILDERMUTH.